Sept. 13, 1932.  O. V. MARTIN  1,877,733
ANHYDROUS METALLIC CHLORIDES AND THEIR PREPARATION
Filed Sept. 24, 1930    2 Sheets-Sheet 1
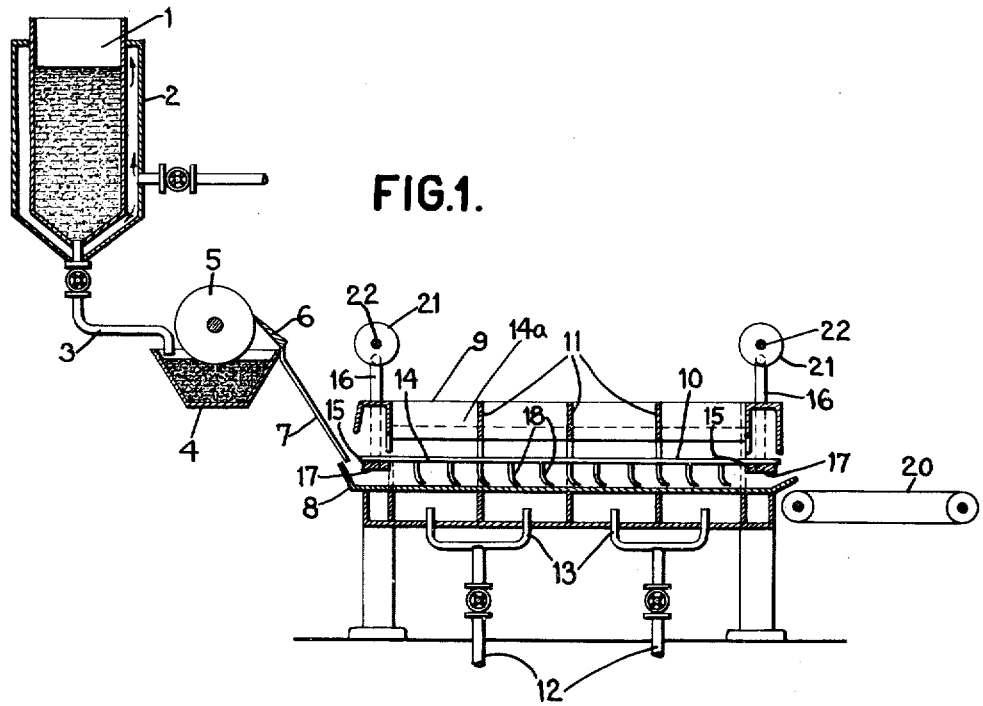
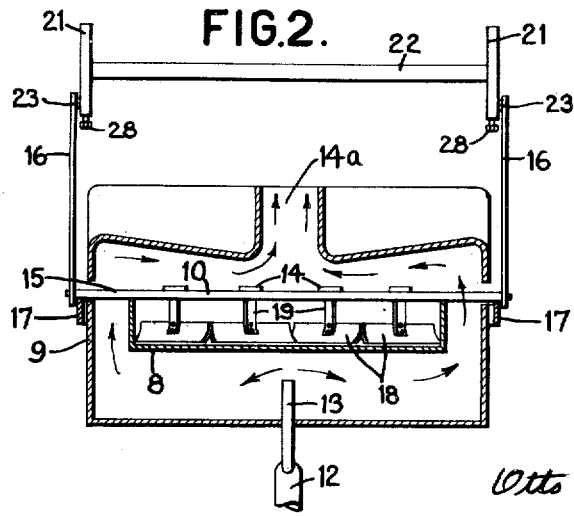

Sept. 13, 1932. O. V. MARTIN 1,877,733
ANHYDROUS METALLIC CHLORIDES AND THEIR PREPARATION
Filed Sept. 24, 1930 2 Sheets-Sheet 2
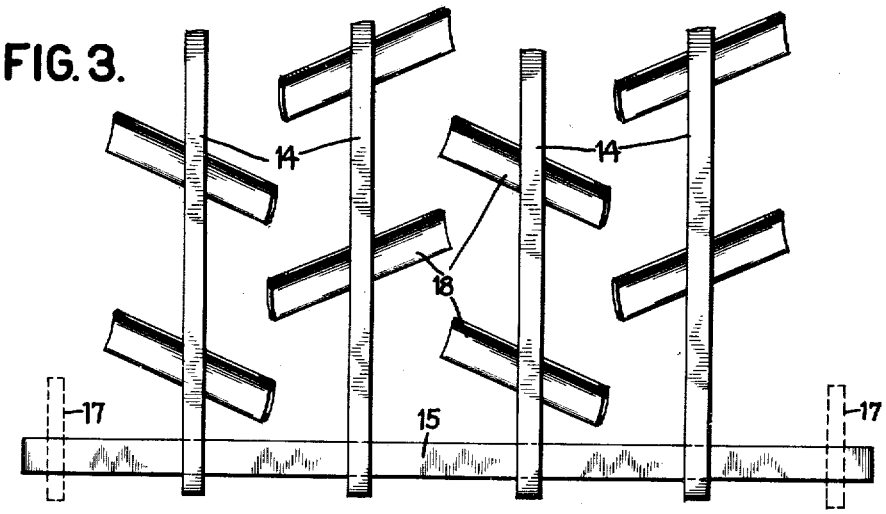
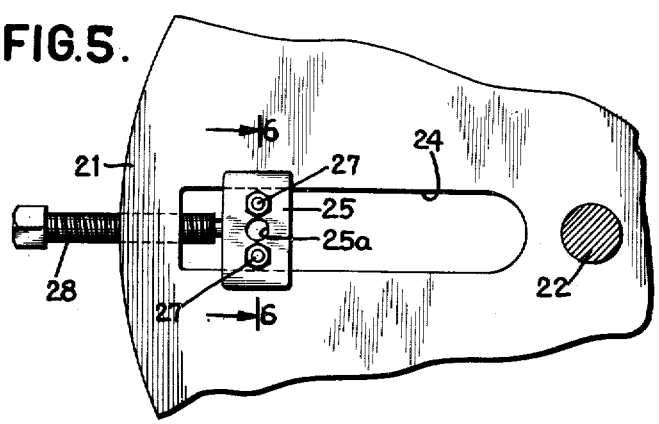
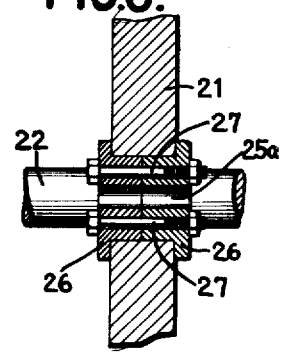
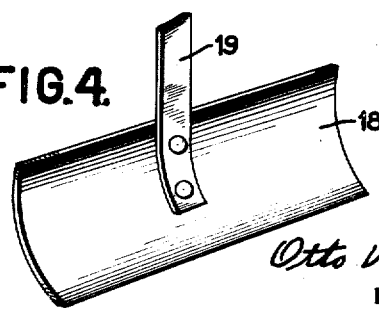
Otto V. Martin
INVENTOR
BY ATTORNEY
R. J. Dearborn Patented Sept. 13, 1932

1,877,733

UNITED STATES PATENT OFFICE

OTTO V. MARTIN, OF SAND SPRINGS, OKLAHOMA, ASSIGNOR TO THE TEXAS CHEMICAL PRODUCTS COMPANY, OF NEW YORK, N. Y., A CORPORATION OF DELAWARE

ANHYDROUS METALLIC CHLORIDES AND THEIR PREPARATION

Application filed September 24, 1930. Serial No. 483,992.

This invention relates to anhydrous metallic chlorides, particularly the chlorides of the alkaline earth group, and to an improved method for their preparation.

In its broadest aspect the invention contemplates the preparation of anhydrous metallic chlorides, particularly anhydrous calcium or magnesium chloride, in comminuted form, by a process comprising treating an aqueous solution of the salt to produce particles or flakes consisting substantially of salt in the hydrated form, and subjecting the resulting particles to dehydration at relatively low temperatures wherein they are contacted with unsaturated gas to absorb the water from the particles and thereby produce the salt in an improved anhydrous form.

Heretofore in the preparation of anhydrous metallic salts, such as calcium chloride, it has been the usual practice to charge the concentrated calcium chloride solution, composed largely of hydrates having roughly thirty per cent of water associated therewith either as water of solution or as water of crystallization, to heated kettles wherein the solution may be subjected to prolonged and vigorous heating at relatively high temperatures to remove the water of solution or of crystallization. This method is expensive and difficultly operable, due to the excessive heating that must be applied to the kettle in order to drive off the water.

Moreover, the metallic chlorides, particularly those of calcium and magnesium, possess the peculiar property of being extremely soluble, which militates in a large measure against readily producing the anhydrous product by heating in this manner while in substantially liquid form, since with increasing temperatures the salts become increasingly more soluble in the water which is present and which it is being attempted to remove.

When the salt undergoing treatment by conventional methods in kettles is finally dehydrated, there remains in the kettle a dense hard cake-like mass of substantially anhydrous salt which must be removed therefrom with considerable difficulty, after which it may be subjected to grinding in a mill to convert it into desired granular or pulverulent form suitable for handling and for commercial use. Such grinding is objectionable, since it may be productive of a large amount of undesired fine material with considerable variation in the size and shape of the resulting particles.

On the other hand, where the salt in the form of particles of hydrated material is subjected to dehydration in a kiln wherein it is subjected to rigorous heating, the particles may be expanded or burst by the sudden escape of moisture impaled within the interior of the particle and which has been suddenly converted into vapor as a result of excessive or rapid heating.

I have found that by subjecting the particles of hydrated salt to dehydration at relatively low temperatures by contacting the particles with unsaturated gas under conditions such that the particles absorb a minimum amount of heat from the gas, while the moisture is gradually and uniformly absorbed from the particles by the gas, the resulting product comprises particles which are more uniform in size and shape than the prior art product which has undergone harsh treatment or rigorous heating in order to produce it in the anhydrous form.

Thus by exposing the particles to unsaturated gas under conditions such that the temperature of the particles during the greater portion of the dehydrating step is maintained preferably not in excess of 200° F., the water of hydration is absorbed from the particles by the gas without suddenly converting the water into steam or vapor within the particles and which tends to distort and burst the particles. Consequently, when employing the method of my invention, the water of hydration is removed gradually, leaving a dehydrated particle having substantially the same size and shape that it had prior to dehydration and containing innumerable fine pores. Thus when preparing the anhydrous salt in the form of flakes, the flakes following dehydration have substantially the same external dimensions as they had prior to dehydration and retain their flat smooth faces or surfaces.

Since the size and shape of the flakes of the anhydrous product prepared according to my invention remain substantially the same as that of the flakes of the hydrated form, it is readily seen that these dehydrated flakes possess a greater degree of porosity per unit volume than the flakes or particles of the prior art product produced by removing the water from substantially the same hydrated material and which have been subjected to popping or distortion during dehydration as commonly practiced wherein they are heated at relatively high temperatures in order to vaporize and drive off the water of hydration.

Where the prior art product is prepared by rigorously heating the solution to form a fused mass of anhydrous salt which is then comminuted by grinding, the resulting particles are not only irregular in shape and non-uniform in size, but are also very friable or fragile and tend to disintegrate and crumble very readily during handling, whereas the particles or flakes of anhydrous salt produced by the method of my invention are uniformly similar or symmetrical in shape, size and structure and are also extremely refractory, being capable of withstanding exceedingly rough handling without substantial breakage or disintegration.

My product is therefore adapted to packaging in sacks, thus avoiding the necessity of using metal drum containers. Furthermore the particles or flakes, due to their very uniform size and shape and to their strength or ruggedness, are particularly adapted to flow through mechanical feeders or distributing means without crumbling therein or clogging up the mechanism as may frequently occur with the prior art product during application in its various fields of use.

Since the particles of my product retain the same size and shape that they possessed before dehydration, the density of my anhydrous product is therefore always definitely known and depends upon the amount of water of hydration originally present in the hydrated form. For example, the hydrated salt in a fused condition, or as flakes of cooled hydrate, and consisting of approximately 25 percent water and 75 percent anhydrous calcium chloride may have a density of approximately 1.75 grams per cubic centimeter, so that upon removal of the 25 percent of water without substantial change in the volume of the material, the resulting anhydrous flakes will have a density of approximately 1.32 grams per cubic centimeter.

The flake or particle density of my anhydrous product may be controlled in this way by regulating the amount of water present in the hydrate which is to be converted to the anhydrous form and may range from 1.35° to 1.40 grams per cubic centimeter. I have found that the density of the particles of the prior art product do not exceed approximately 1.20 grams per cubic centimeter.

A unit volume of my comminuted anhydrous product may weight as much as 20 percent or more greater than a similar unit of the prior art product while still possessing a much greater degree of porosity or exposing a much larger area of active surface per unit of volume than the product generally available hitherto.

A salt particle having a very high degree of porosity is extremely desirable since the particles thereby possess a very greatly increased area of active surface which is of distinct benefit, particularly where the salt particles are employed as drying media, since their absorptive capacity for water is largely dependent upon the area of exposed surface upon and through which absorption may occur. A further advantage of such a product arises when it is desired to dissolve the salt in aqueous solution, since the porous structure facilitates solution of the salt, while the escape of the minute quantities of air present within the pores during the process of solution tends to agitate the solution as well as the particles undergoing solution, and thus still further increase the solution rate.

My invention therefore comprises heating an aqueous solution of the salt to remove water from the solution thereby forming a fused or molten mass of salt which is converted by cooling and mechanical means to a comminuted material consisting substantially of salt in the hydrated form, and then subjecting the resulting particles to dehydration in a dehydrator wherein they are brought into contact with streams of unsaturated gas while disposed in a relatively shallow bed of moving particles in order to absorb water from the particles and produce anhydrous salt consisting of ruggedly formed particles of uniform size and shape and having a high degree of porosity.

In order to more clearly understand the invention, reference will now be made to the figures of the accompanying drawings illustrating a preferred embodiment of apparatus adapted to the practice of the invention, and in which:

Figure 1 is a diagrammatic elevational view illustrating apparatus arranged to carry out the invention.

Figure 2 is a cross sectional view of the dehydrator shown in Figure 1.

Figure 3 illustrates a portion of the rake or agitating means employed in the dehydrator of Figures 1 and 2.

Figure 4 illustrates a scoop element of the rake shown in the preceding figures.

Figure 5 illustrates mechanism adapted to regulate the operation of the rake shown in the preceding figures.

Figure 6 is a sectional view taken on the line 6—6 of Figure 5.

Referring to Figures 1 and 2 the salt solution is charged to a kettle 1, having a jacket 2 into which a heating medium may be introduced, wherein water is removed by boiling to form a molten or fused mass of material still containing substantially the amount of water required to form hydrates of the salt upon cooling. The fluid hydrate may then be delivered through a pipe 3 to a pan 4 into which the surface of a roll 5 dips. The roll, which may be of more or less conventional type, picks up the molten mass and carries it around, while cooling it, until scraped off in flake-like form by a knife or blade 6. The roll 5 may be cooled by passing water through its interior.

While the formation of flakes is thus described, it is contemplated that the material may be converted into any other suitable lump-like or pulverulent state by other mechanical means prior to dehydration.

The flakes are then delivered by a chute or conveying means 7 to a shallow pan or shelf 8 in a dehydrating oven 9 and over which pan they are moved while subjected to rolling and stirring, by a rake 10, which will presently be described in connection with the discussion of the remaining figures.

The oven 9 comprises an elongated chamber having transverse partitions 11 dividing it into a plurality of successive and separate dehydrating zones through which the pan 8 extends and through which separate and parallel streams of gas flow over and across the particle bed in a direction at right angles to the general path of flow of salt through the oven.

The gas which may comprise either air or a gas derived from the combustion of oil or other material, and which may be conditioned either by heating or refrigerating in order to have a desired degree of unsaturation, is conducted from a source, not shown in the drawing, by pipes 12 and introduced through branch pipes 13 to the dehydrator 9. Preferably the gas is introduced to the dehydrator beneath the pan 8 from which point it may divide to flow around both sides of the pan and thence across the top over the mass of salt particles deposited thereon to the discharge port 14a extending along the top of the dehydrator from which it may be discharged to the atmosphere.

While the use of gas or air from a remote source has been described it is contemplated that fuel gas may, if desired, be conducted to the branch pipes 13 on which suitable burner tips may be secured so as to promote combustion within the chamber below the pan 8 to form hot gaseous products of combustion which flow under and around the sides of the pan 8 in the manner already described.

The rake 10 comprises, as shown in Figures 2, 3 and 4, a framework consisting of a plurality of longitudinal and parallel members 14, the ends of which are preferably rigidly attached to cross members 15 whose ends project through suitable slots provided in the sides of the dehydrator and to which the depending crank arms 16 are rigidly secured. Bearings 17 exteriorly attached to the walls of the dehydrator serve as slides over which the projecting ends of the cross members 15 move while supporting the rake throughout a portion of its forward and backward travel as will be described in more detail in connection with Figures 5 and 6.

Curved plates or scoops 18 are rigidly secured at suitable intervals to and depend below the parallel members 14 by handles or shanks 19, so that their horizontal edges are angularly disposed with reference to the parallel members 14.

The propelling faces of the scoops in each row are alternately inclined towards and away from those in adjacent rows, while those in one row are staggered with respect to those in the next. The degree of this inclination of the scoops or scrapers either toward or away from each other is preferably so chosen as to impart the maximum amount of rolling or ploughing motion to the particle mass and yet obtain a suitable rate of forward movement of the mass through the dehydrator. That is, in moving through the dehydrator, portions of the particle or crystal mass are intermittently rolled over and pushed along the pan 8 in a zigzag direction so as to constantly re-expose the surfaces of the particles or crystals to direct contact with the unsaturated drying gas until finally discharged in a dehydrated state onto a conveyor 20 to be delivered for packaging or other disposition.

Reciprocatory motion is imparted to the rake 10 by crank wheels 21 rigidly mounted on shafts 22 exteriorly supported above the dehydrator and to which the crank arms 16, previously mentioned, are rotatably attached by crank pins 23. The shafts 22 are operably connected to suitable driving means, not shown, adapted to impart synchronous rotary movement thereto.

As shown in Figures 5 and 6 the crank wheels 21 are provided with an elongated radial slot 24 adapted to accommodate a sliding cross-head member 25 having a hole 25a to receive the crank pins 23 which are rigidly secured to the upper ends of the crank arms 16. The sliding member 25 preferably comprises two similar sections 26 clamped together by bolts 27 to thereby permit its insertion or removal from the slot 24.

In operation the cross-head member 25 moves back and forth in the slot as the crank wheel rotates, the weight of the rake holding it out towards the periphery of the wheel during that portion of the rotary movement of the wheel where the slot is inclined downwards from the axis of the wheel, and then tending to hold it inwards toward the axis of the wheel during the remainder of the rotary movement. The length of the arms 16 is chosen such that the rake is held above and out of contact with the slide bearings 17 when the crosshead 25 is moving in that portion of the slot 24 relatively near the periphery of the crank wheels, otherwise, if at the position corresponding to the maximum horizontal throw of the crank wheel the rake were already in contact with the fixed slide bearing 17, continued rotation of the crank wheels would be prevented.

Thus the rake describes a semi-elliptical movement wherein it moves downwardly forward into contact with the pulverulent material, moves horizontally forward rolling the material with it, until with continued forward movement it rises upwardly out of the particle mass. When completely clear of the particle mass it moves backward in a similar manner preparatory to again engaging the particle mass.

An adjustable set screw 28 extending radially through the periphery of the wheel 21 and projecting into the slot 24 serves as a means of regulating the sliding movement of the cross-head 25 along the slot 24. As the distance along the slot from the axis of the wheel 21 through which the crosshead slides is decreased, by projecting the screw 28 further into the slot 24, the horizontal back and forth movement of the rake is also correspondingly limited thereby decreasing the amount of rolling exerted upon the particles and also the distance through which they are moved over the pan 8 in each forward stroke of the rake.

In the practice of my invention for the preparation of anhydrous calcium chloride, I may charge a salt containing solution, which may comprise roughly from 30 to 40 percent by weight of solid matter, to the vessel 1 wherein a large proportion of the water is driven off to form a fused or molten mass of salt comprising from 70 to 80 percent of anhydrous material ($CaCl_2$) which is largely in the form of hydrates ($CaCl_2.6H_2O$, $CaCl_2.4H_2O$, etc.) when cooled.

The resulting fused material is transferred through the pipe 3 to the pan 4, where by means of the roll 5, which may have cooling water flowing through its interior, and the blade 6 cooperating therewith it is converted into a solid comminuted or flake-like form consisting of salt substantially in the hydrated form.

The particles of hydrated material are then conveyed by the chute 7 to the pan 8 in the dehydrating oven 9 wherein the particles are subjected to stirring or rolling while being intermittently propelled in a zig-zag path over the pan 8 by the rake 10 thereby coming into contact with the streams of unsaturated gas flowing through the successive compartments and over the relatively shallow mass of moving particles disposed over the pan and which are discharged in an anhydrous condition from the pan 8 onto the conveyor 20 for packaging or for other disposition.

The rate at which dehydration takes place may be closely regulated by maintaining different temperatures in the successive dehydrating zones, or by varying the volume and condition of the gas passing through the different zones, such as its degree of initial saturation or its temperature. Ordinarily I maintain a temperature gradient throughout the dehydrator such that the temperature of the atmosphere within the first compartment or zone may be around 150° F. while that in the last zone may be about 300° F. The temperatures are preferably adjusted so that the particles are maintained at a temperature not in excess of about 200° F. during the absorption by the gas of the major portion of the water of hydration so as to avoid distorting or deforming the particles. Following this the particles may be subjected to temperatures of 300° F. or higher to remove the final traces of moisture without tending to disrupt the particle structure.

It is contemplated that by employing cold unsaturated gas or air, correspondingly lower temperatures may prevail in the dehydrator while producing the desired anhydrous product.

I have found that flowing a plurality of hot streams of gas across a relatively narrow bed in this manner rather than employing countercurrent flow of salt and hot or unsaturated gas is more effective from the standpoint of satisfactorily removing the water of crystallization from the particles. In this way the particles are maintained continually in contact with relatively unsaturated gas since the gas while flowing across the mass of particles does not remain in contact therewith for a sufficient length of time to approach complete saturation with water removed from the particles.

In this way I am able to produce salt substantially entirely in the anhydrous form or containing not less than 99½ percent of anhydrous salts. The particles or flakes have a very high degree of porosity and uniformity of structure, since they are subjected to moderate treatment and handling and the water of crystallization is gradually removed and absorbed therefrom by the gas, leaving particles having innumerable fine pores from and through which the water was removed during the drying step so that the size or external shape of each particle remains substantially unchanged from what it was prior to dehydration.

As a result of the low temperatures employed in my process, I am able to prepare anhydrous chloride which is free from the basic materials which are usually present in the anhydrous salt prepared by dehydrating the salt at high temperatures as in the ordinary methods of manufacture. For example, during the preparation of anhydrous calcium chloride by dehydration at high temperatures a chemical reaction may occur to a certain extent between the chloride and the water associated therewith forming appreciable amounts of calcium oxide with evolution of hydrogen chloride.

The product as hitherto produced in the industry usually contains other impurities, particularly oxides of iron or of other metals from which the kettles or dehydrating apparatus may be fabricated, due to the fact that at the high temperatures customarily employed the salt solution undergoing treatment, or the products of secondary reaction occurring within the solution, react to an appreciable extent with the metal with which the solution is in contact. As a result of these impurities the product hitherto available is usually of a dark greyish color and dirty in appearance, whereas the product prepared by my process is distinctly white in color and clean in appearance, due to the complete absence of this foreign matter.

Obviously many modifications and variations of the invention, as hereinbefore set forth, may be made without departure from the spirit and scope thereof, and therefore only such limitations should be imposed as are indicated in the appended claims.

I claim:—

1. In the method of preparing anhydrous metallic chloride from a hydrated form of the salt, the step which comprises gradually absorbing water of hydration by exposing particles of the hydrated salt to a succession of streams of fresh relatively unsaturated drying gas whereby the anhydrous product is produced without distorting the shape of the particles.

2. In the method of preparing anhydrous metallic chloride from a hydrated from of the salt, the step which comprises exposing particles of the hydrated salt in stages to a plurality of streams of air whereby water is absorbed from the particles by the gas to form the anhydrous product without distorting the shape of the particles.

3. In the method of preparing anhydrous calcium chloride from a hydrated form of the salt, the steps which comprise exposing the particles of the hydrated salt to gas whereby water is absorbed from the particles, and maintaining the particles at a temperature not in excess of 200° F. during the removal of substantially all of the water of hydration.

4. In the method of preparing anhydrous calcium chloride from a hydrated form of the salt, the steps which comprise forming particles of hydrated salt composed of about 75% of anhydrous salt exposing the particles of the hydrated salt to gas whereby the water of hydration is absorbed from the particles maintaining the particles at a temperature not in excess of about 200° F. during removal of the major portion of the water of hydration, and finally subjecting the particles to higher temperatures to remove the final traces of moisture.

5. In the method of preparing anhydrous calcium chloride from the hydrated form of the salt, the steps which comprise disposing the hydrated salt in the form of a shallow bed of particles, exposing the particles in stages to a plurality of streams of gas flowing over the bed while subjecting the particles to stirring to constantly re-expose their surfaces to the gas to effect removal of the water of hydration and thereby produce the anhydrous product.

6. The method of preparing anhydrous metallic chlorides from aqueous solutions of the salt comprising concentrating the solution to form a fused body of salt hydrate, comminuting the fused material by cooling and mechanical means to form particles of hydrated salt, disposing the hydrated particles in a shallow bed and subjecting them to stirring thereon, and exposing the particles in stages to a plurality of unsaturated streams of gas flowing across the bed to absorb water from the particles and thereby produce the anhydrous product.

7. The method of preparing comminuted anhydrous calcium chloride from an aqueous solution of the salt, comprising concentrating the solution to form a fused body of salt hydrate, comminuting the fused salt by cooling and mechanical means to form particles of hydrated salt, exposing the hydrated particles to gas whereby water is absorbed from the particles, and maintaining the particles at a temperature not in excess of 200° F. during removal of substantially all of the water of hydration.

8. The method of preparing comminuted anhydrous calcium chloride from an aqueous solution of the salt, comprising concentrating the solution to form a fused body of salt hydrate composed of about 75% anhydrous salt, comminuting the fused salt by cooling and mechanical means to form particles of hydrated salt, exposing the hydrated particles to gas whereby water is absorbed from the particles, maintaining the particles at a temperature not in excess of about 200° F. during removal of the major portion of the water of hydration, and finally subjecting the particles to higher temperatures to remove the final traces of moisture.

9. The improvement in the method of removing moisture from hydrated calcium chloride in particle form and containing about thirty percent of water which consists in gradually removing a substantial proportion of the water content therefrom by exposing the salt to the action of a succession of streams of fresh relatively unsaturated drying gas whereby the moisture is removed without distortion of the particles.

10. The improvement in the method of removing moisture from hydrated calcium chloride in particle form and containing about thirty percent of water which consists in gradually removing a substantial proportion of the water content therefrom by exposing the salt in stages to a plurality of streams of drying gas whereby moisture is removed without distortion of the particles.

11. The improvement in the method of removing moisture from hydrated calcium chloride in particle form and containing about thirty percent of water which consists in gradually removing a substantial proportion of the water content therefrom by exposing the salt to the action of a drying gas and maintaining the particles at a temperature not in excess of about 200° F. whereby the moisture is removed without distortion of the particles.

In witness whereof I have hereunto set my hand this 15th day of Sept., 1930.

OTTO V. MARTIN.

CERTIFICATE OF CORRECTION.

Patent No. 1,877,733.  September 13, 1932.

OTTO V. MARTIN.

It is hereby certified that the name of the assignee in the above numbered patent was erroneously described and specified as "The Texas Chemical Products Company," whereas said name should have been described and specified as Texaco Salt Products Company, as shown by the records of assignments in this office; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.

tion of the water content therefrom by exposing the salt to the action of a succession of streams of fresh relatively unsaturated drying gas whereby the moisture is removed without distortion of the particles.

10. The improvement in the method of removing moisture from hydrated calcium chloride in particle form and containing about thirty percent of water which consists in gradually removing a substantial proportion of the water content therefrom by exposing the salt in stages to a plurality of streams of drying gas whereby moisture is removed without distortion of the particles.

11. The improvement in the method of removing moisture from hydrated calcium chloride in particle form and containing about thirty percent of water which consists in gradually removing a substantial proportion of the water content therefrom by exposing the salt to the action of a drying gas and maintaining the particles at a temperature not in excess of about 200° F. whereby the moisture is removed without distortion of the particles.

In witness whereof I have hereunto set my hand this 15th day of Sept., 1930.

OTTO V. MARTIN.

CERTIFICATE OF CORRECTION.

Patent No. 1,877,733.                      September 13, 1932.

OTTO V. MARTIN.

It is hereby certified that the name of the assignee in the above numbered patent was erroneously described and specified as "The Texas Chemical Products Company," whereas said name should have been described and specified as Texaco Salt Products Company, as shown by the records of assignments in this office; and that the said Letters Patent should be read with this correction therein that the same may conform to the record of the case in the Patent Office.

Signed and sealed this 29th day of November, A. D. 1932.

(Seal)                                                    M. J. Moore,
Acting Commissioner of Patents.

CERTIFICATE OF CORRECTION.

Patent No. 1,877,733.                                    September 13, 1932.

OTTO V. MARTIN.

It is hereby certified that the name of the assignee in the above numbered patent was erroneously described and specified as "The Texas Chemical Products Company," whereas said name should have been described and specified as Texaco Salt Products Company, as shown by the records of assignments in this office; and that the said Letters Patent should be read with this correction therein that the same may conform to the record of the case in the Patent Office.

Signed and sealed this 29th day of November, A. D. 1932.

M. J. Moore,
Acting Commissioner of Patents.

(Seal)